United States Patent

Tooi

Patent Number: 5,386,089
Date of Patent: Jan. 31, 1995

[54] TRACK BALL COORDINATE DATA INPUTTING DEVICE

[75] Inventor: Shuichi Tooi, Tochigi, Japan

[73] Assignee: Mitsumi Electric Co., Ltd., Tokyo, Japan

[21] Appl. No.: 144,539

[22] Filed: Oct. 28, 1993

[30] Foreign Application Priority Data

Oct. 30, 1992 [JP] Japan ............... 4-081406[U]

[51] Int. Cl.⁶ .................. G09G 5/00; G08C 21/00
[52] U.S. Cl. ........................ 178/18; 345/167
[58] Field of Search ............ 178/18, 19; 345/157, 345/158, 161, 163, 164, 167; D14/114; D21/48; D13/171

[56] References Cited

U.S. PATENT DOCUMENTS 4,952,919  8/1990  Nippoldt ............... 345/167

FOREIGN PATENT DOCUMENTS 4-73241  6/1992  Japan .
4-73242  6/1992  Japan .

Primary Examiner—Stephen Chin
Assistant Examiner—Kevin Kim
Attorney, Agent, or Firm—Whitham, Curtis, Whitham and McGinn

[57] ABSTRACT

An object of this invention is to provide a track ball coordinate data inputting device in which means for holing supporting ball elements adapted to support the ball is simplified in structure, so that the supporting ball elements can be built in it with ease. In a track ball coordinate data inputting device, supporting ball element holding sections for holding supporting ball elements adapted to support a ball have inserting grooves which are each like a cut circle in section which is obtained by cutting a true circle equal in diameter to the supporting ball element with a chord shorter than the diameter. Each of the inserting grooves is engraved in the spherical inner wall surface of the accommodating section in such a manner that it is extended downwardly from the upper edge of the spherical inner wall surface and is wide enough to allow the passage of the supporting ball element. Each inserting grooves has a lower end portion formed into a lower surface receiving portion which has a spherical surface for receiving the supporting ball element, a lower wall portion formed into thin side surface receiving portions which are elastically flexible in a direction of groove width, and catching protrusions above the side surface receiving portions which are protruded inwardly of the inserting groove.

15 Claims, 3 Drawing Sheets

TRACK BALL COORDINATE DATA INPUTTING DEVICE

BACKGROUND OF THE INVENTION

1. Field of the Invention

This invention relates to a track ball coordinates data inputting device which is employed as an external input device for personal computers, word processors or the like, to simplify an operation of inputting and specifying data on X-Y coordinate positions with high accuracy.

2. Related Art

A conventional track ball coordinate data inputting device of this type (hereinafter referred to as "a track ball device", when applicable) is designed as shown in FIGS. 5 through 7. The track ball device 1 comprises: a casing 2; a coordinates inputting ball 3 which partially appears in the upper surface of the casing 2; a pair of drivers 4 and 5 provided inside the casing 2 in such a manner that they are in contact with the ball 3 in two directions which are perpendicular to each other; and two detecting sections 6 and 7 adapted to detect an amount of rotation of the ball 3 as X-coordinate data and Y-coordinate data.

The detecting sections 6 and 7 are connected to a printed circuit board (not shown) having a predetermined conductor pattern which is provided inside the casing 2. In addition, for instance coordinate position determining and nullifying micro-switches are mounted on the printed circuit board which are operated with push buttons provided on the upper lid of the casing 2.

The ball 3 is accommodated in an accommodating section 8a circular in section, which is provided at the center of a synthetic resin frame member 8 in such a manner that it is opened upwardly. In order to rotatably support the ball 3 in such a manner that it floats in the accommodating section 8a, a plurality of supporting ball elements 9 (five supporting ball elements in the case of FIG. 6) are rotatably held with their outer surfaces partially exposed inwardly of the spherical inner wall of the accommodating section 8a.

That is, the ball 3 is not in contact with the spherical inner wall of the accommodating section 8a, and instead it is in point contact with the supporting ball elements 9. Hence, the ball 3 can be smoothly turned with a considerably small operating force.

With the track ball device 1, the direction of rotation and the amount of rotation of the ball 3 are detected by the detecting sections 6 and 7 with the aid of the drivers 4 and 5. The output detection signals of those detecting sections 6 and 7 are applied through connecting cables to a computer or the like, so that the cursor is moved on the screen of a display unit connected to the computer. In this operation, the position of the cursor at that time is determined or nullified by operating the input button on the casing 2.

In the conventional track ball device 1 designed as described above, the supporting ball elements 9 are put in five recesses 8b, respectively, which are formed at equal angular intervals in the inner wall of the accommodating section 8a of the frame member 8, and a ring-shaped holding member 8c is placed over the supporting ball elements 9, so that the latter 9 are held in the recesses 8b under pressure. Under this condition, legs 8d extended from the ring-shaped holding member 8c are inserted into through-holes 8e, respectively, which are formed adjacent to the recesses 8b, until the end portions of the legs 8d are protruded from the lower ends of the through-holes 8e. The end portions thus protruded are peened, so that the ring-shaped holding member 8c is fixedly secured to the frame member 8. Hence, it is rather intricate and troublesome to assemble the components for holding the supporting ball elements 9. In addition, the assembling work cannot be achieved without the skilled person. As a result, the resultant track ball device is liable to be high in manufacturing cost, and low in assembling accuracy.

SUMMARY OF THE INVENTION

In view of the foregoing, an object of this invention is to provide a track ball coordinate data inputting device in which the means for holding the supporting ball elements adapted to support the ball is simplified in structure, so that the supporting ball elements can be built in it with ease.

The foregoing object of the invention has been achieved by the provision of a track ball coordinate data inputting device comprising: a coordinate data inputting ball; a frame having a semi-spherical accommodating section which is opened upwardly to accommodate the ball; a plurality of supporting ball elements for rotatably supporting the ball, the supporting ball elements being rotatably supported with the outer surfaces thereof partially exposed inwardly of the spherical inner wall of the accommodating section; and detecting sections mounted on the frame, for detecting coordinate data from an amount of rotation and a direction of rotation of the ball, wherein the frame has a plurality of inserting grooves, each of which is engraved in the spherical inner wall surface of the accommodating section in such a manner that it is extended downwardly from the upper edge of the spherical inner wall surface and is wide enough to allow the passage of the supporting ball element, each of the inserting grooves having:
 a lower end portion formed into a lower surface receiving portion for receiving the supporting ball element;
 a lower wall portion formed into thin side surface receiving portions which are elastically flexible in a direction of groove width; and
 catching protrusions above the side surface receiving portions which are protruded inwardly of the inserting groove, each of the supporting ball elements being pushed into the respective one of the inserting grooves until the supporting ball element is brought into contact with the lower surface receiving portion riding over the catching protrusions, thus being rotatably supported by the lower surface receiving portion, the side surface receiving portion, and the catching protrusions.

In the track ball coordinate data inputting device of the invention, which is designed as described above, the plurality of supporting ball elements are combined with the frame as follows: The supporting ball elements are dropped into the inserting grooves 32 of the frame from above, respectively. Since each of the grooves has the catching protrusions at the lower end, the supporting ball element is detained at the catching protrusions, being prevented from dropping below the latter. However, the side surface receiving portions integral with the catching protrusions are elastically flexible in the direction of width of the groove. Hence, the supporting ball element at the catching protrusions may be pushed down with a jig like a pin. More specifically, the side surface receiving portions integral with the catching protrusions are bent away from each other by pushing the supporting ball element with the jig, so that the supporting ball element rides over the catching protrusions while pushing the latter laterally away from each other, thus being brought into contact with the lower surface receiving portion.

As a result, the supporting ball element is rotatably supported by the lower surface receiving portion, the side surface receiving portion, and the catching protrusions which are formed at the lower end of the inserting groove 32, with its outer surface partially exposed inwardly of the accommodating section. The supporting ball elements thus held rotatably support the ball.

In the track ball coordinate data inputting device, the inserting grooves, the lower surface receiving portions, the side surface receiving portions, and the catching protrusions are integral with the frame. Therefore, it is unnecessary to additionally provide a part for holding the ball.

Hence, with the device of the invention, the means for holding the supporting ball elements adapted to support the ball is simple in structure, and therefore the supporting ball elements can be combined with the frame with ease.

DETAILED DESCRIPTION OF THE PREFERRED EMBODIMENT

One preferred embodiment of this invention will be described with reference to the accompanying drawings.

Figure 1:
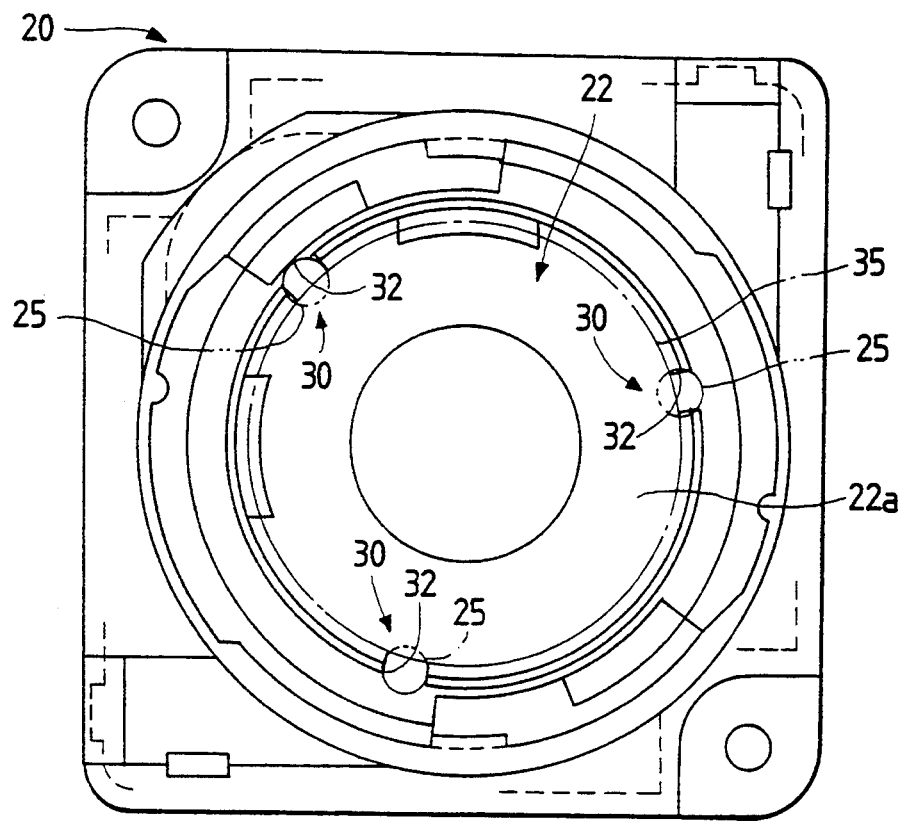
FIG. 1 is a plan view showing a frame which is one of the essential components forming one example of a track ball coordinate data inputting device according to this invention.

FIG. 1 shows a frame 20 which is one of the essential components in one example of a track ball coordinate data inputting device according to the invention.

The frame 20 is formed by injection-molding synthetic resin. The frame 20 has a semi-spherical accommodating section 22 at the center which is opened upwardly to receive a coordinate data inputting ball 35. The frame 20 has three supporting-ball-element supporting sections 30 at a predetermined level of the accommodating section 22, in such a manner that the three supporting-ball-element holding sections 30 are arranged at equal angular intervals.

Similarly as in the case of the conventional track ball device, in order to rotatably support the ball 35 in the accommodating section, supporting ball elements 25 are rotatably supported with their outer surfaces partially exposed inwardly of the supporting ball element holding sections 30, and detecting sections (not shown) are provided which are adapted to detect coordinate data from the amount of rotation and the direction of rotation of the ball 35. However, the track ball device of the invention is different from the conventional one in the supporting-ball-element holding sections 30 which form one of the specific features of the invention. Hereinafter, mainly the supporting-ball-element holding sections 30 will be described.

Figure 2:
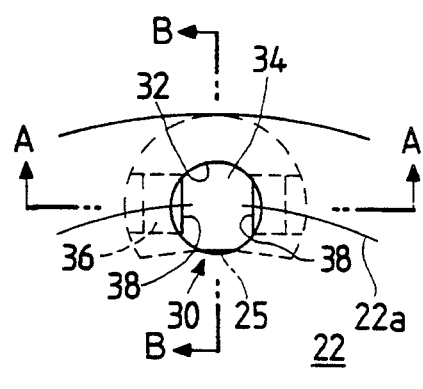
FIG. 2 is an enlarged plan view showing a supporting ball element holding section in the frame shown in FIG. 1.

Each of the supporting-ball-element holding sections 30 has an inserting groove 32, the section of which is like a cut circle which is abounded by cutting a true circle equal in diameter to the supporting ball element with a chord shorter than the diameter. The inserting groove 32, as shown in FIGS. 2 through 4 in detail, is engraved in the spherical inner wall surface 22a of the accommodating section 22 in such a manner that it is extended downwardly from the upper edge of the spherical inner wall surface 22a and is wide enough to allow the passage of the supporting ball element 25.

Figure 3:
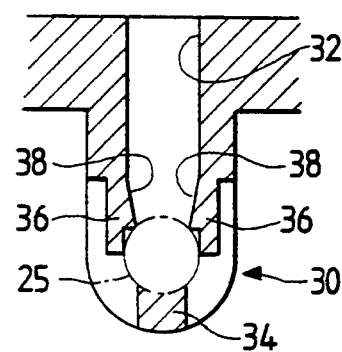
FIG. 3 is a sectional view taken along line A—A in FIG. 2.

The lower end portion of the inserting groove 32 is formed into a lower surface receiving portion 34 which has a spherical surface for receiving the supporting ball element, the lower wall portion of the inserting groove 32, as shown in FIG. 3, is formed into thin side surface receiving portions 36 which are elastically flexible in a direction of groove width. Furthermore, the inserting groove 32 has catching protrusions 38 above the side surface receiving portions 36 which are protruded inwardly of the inserting groove 32.

In the track ball device with the above-described frame 20 according to the invention, the three supporting ball elements 25 are combined with the frame 20 as follows: The supporting ball elements 25 are dropped into the inserting grooves 32 of the frame 20 from above, respectively. Since each of the grooves 32 has the catching protrusions 38 at the lower end, the supporting ball element 25 is detained at the catching protrusions 38, being prevented from dropping below the catching protrusions 38. However, the side surface receiving portions 36 integral with the catching protrusions 38 are elastically flexible in a direction of groove width. Hence, the supporting ball element 25 at the catching protrusions 38 may be pushed down with a jig like a pin. More specifically, the side surface receiving portions 36 integral with the catching protrusions 38 are bent away from each other by pushing the supporting ball element 25 with the jig, so that the supporting ball element 25 rides over the catching protrusions 38 while pushing the latter sideward, thus being brought into contact with the lower surface receiving portion 34.

Figure 4:
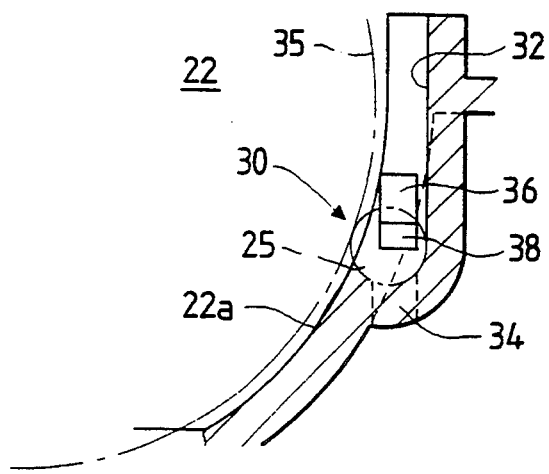
FIG. 4 is a sectional view taken along line B—B in FIG. 2.
Figure 5:
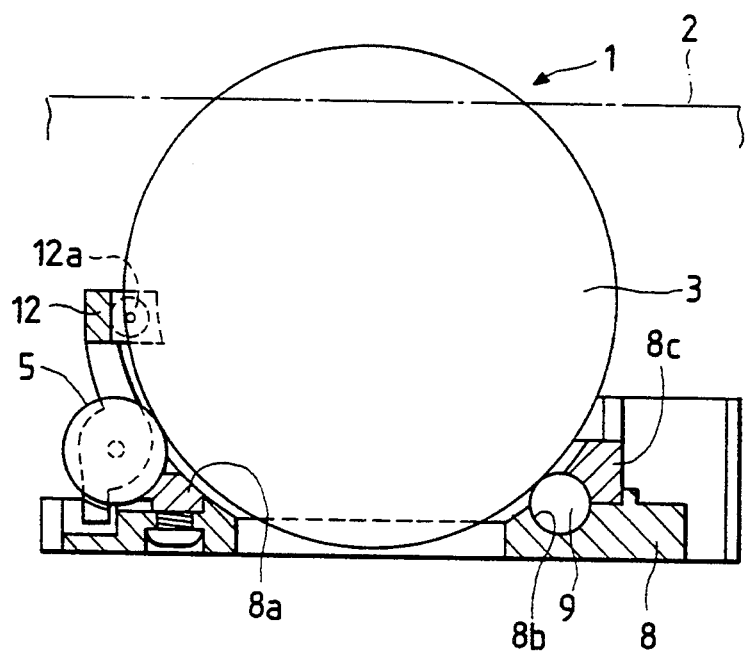
FIG. 5 is a sectional view showing essential components of a conventional track ball coordinate data inputting device.
Figure 6:
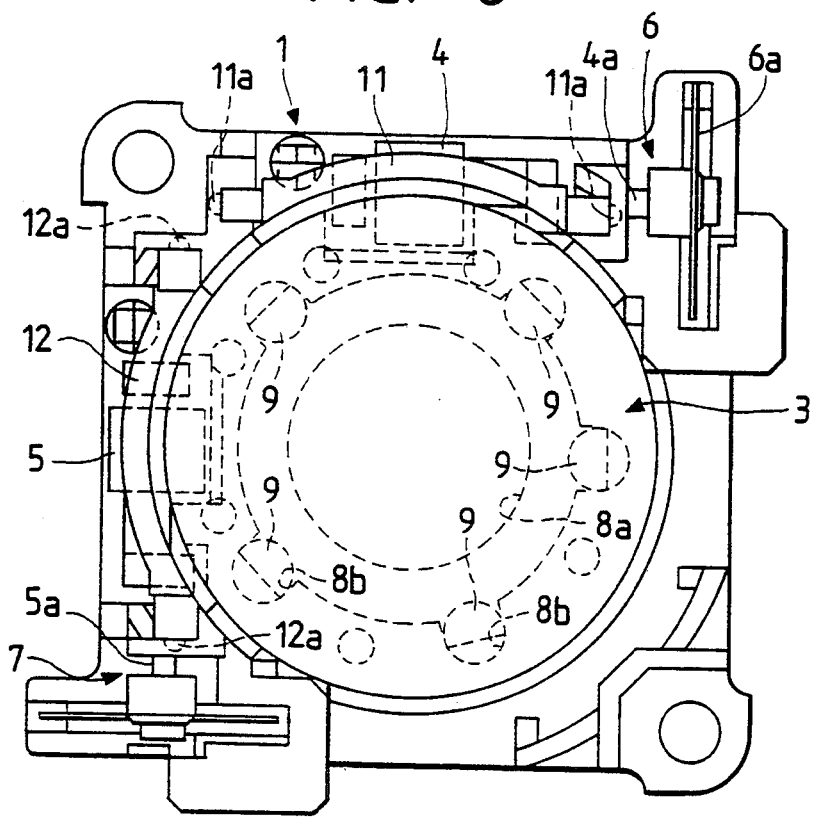
FIG. 6 is a plan view of the conventional device shown in FIG. 5.
Figure 7:
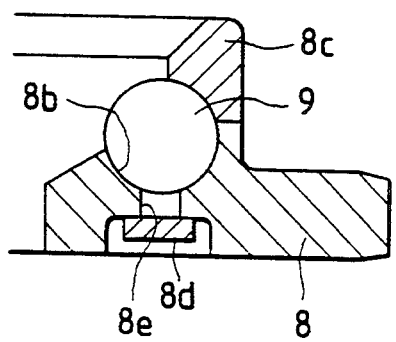
FIG. 7 is a sectional view showing a supporting ball element holding section in the conventional device shown in FIG. 5.

As a result, as shown in FIGS. 1 through 4, the supporting ball element 25 is rotatably supported by the lower surface receiving portion 34, the side surface receiving portion 36, and the catching protrusions 38 which are formed at the lower end of the inserting groove 32, with its outer surface partially exposed inwardly of the accommodating section 22. The supporting ball elements 25 thus held rotatably support the ball 35 as shown in FIG. 4.

In the track ball device, the inserting grooves 32, the lower surface receiving portions 34, the side surface receiving portions 36, and the catching protrusions 38 are integral with the frame 20. That is, no other parts are necessary to hold the supporting ball elements 25.

As is apparent from the above description, the means for holding the supporting ball elements adapted to support the ball is simple in structure, and therefore the supporting ball elements can be combined with the frame with ease.

As is apparent from the above description, the track ball coordinate data inputting device of the invention has the following appreciable effects or merits: The means for holding the supporting ball elements adapted to support the ball is simple in structure, and therefore the supporting ball elements can be combined with the frame with ease.

What is claimed is:

1. A track ball coordinate data inputting device, comprising:
   a coordinate data inputting ball;
   a frame including:
      a semi-spherical accommodating member opened upwardly to accommodate the coordinate data inputting ball;
      a plurality of supporting ball elements for rotatably supporting the coordinate data inputting ball:
      supporting ball dement support means for rotatably supporting the supporting ball elements such that outer surfaces of respective ones of the supporting ball elements are partially exposed inwardly of the spherical inner wall of the semi-spherical accommodating member, the supporting ball dement support means being integrally formed to the frame; and
   detecting means for detecting coordinate data from an amount of rotation and direction of rotation of the coordinate data inputting ball, the detecting means being mounted on the frame,
   wherein the supporting ball element support means includes:
      a plurality of inserting grooves, each of which is engraved in a spherical inner wall surface of the semi-spherical accommodating member in such a manner that the groove is extended downwardly from an upper edge of the spherical inner wall surface and is wide enough to allow a passage of a supporting ball element.

2. A track ball coordinate data inputting device as claimed in claim 1, wherein each of the inserting grooves includes:
   a lower end member formed into a lower surface receiving member for receiving the supporting ball element;
   a lower wall member formed into side surface receiving members which are elastically flexible in a direction of width of the inserting groove; and
   catching protrusions formed above the side surface receiving members, respectively, each of the catching protrusions being protruded inwardly of the inserting groove.

3. A track ball coordinate data inputting device as claimed in claim 2, wherein the supporting ball element is rotatably supported by the lower surface receiving member, the side surface receiving member and the catching protrusions.

4. A track ball coordinate data inputting device, comprising:
   a coordinate data inputting ball;
   a frame including:
      a semi-spherical accommodating member opened upwardly to accommodate the coordinate data inputting ball;
      a plurality of supporting ball elements for rotatably supporting the coordinate data inputting ball;
      supporting ball element support means for rotatably supporting the supporting ball elements in such a manner that outer surfaces of respective ones of the supporting ball elements are partially exposed inwardly of the spherical inner wall of the semi-spherical accommodating member, the supporting ball element support means being integrally formed to the frame; and
   detecting means for detecting coordinate data from an amount of rotation and direction of rotation of the coordinate data inputting ball, the detecting means being mounted on the frame;
   wherein the supporting ball element support means includes a plurality of inserting grooves, each of which is formed in a spherical inner wall surface of the semi-spherical accommodating member.

5. A track ball coordinate data inputting device as claimed in claim 4, wherein said plurality of inserting grooves are formed such that each of said grooves extend downwardly from an upper edge of the spherical inner wall surface.

6. A track ball coordinate data inputting device as claimed in claim 5, wherein each of said grooves has a predetermined diameter to allow passage of a supporting ball element.

7. A track ball coordinate data inputting device, comprising:
   a coordinate data inputting ball;
   a frame including:
      a semi-spherical accommodating member opened upwardly to accommodate the coordinate data inputting ball;
      a plurality of supporting ball elements for rotatably supporting the coordinate data inputting ball;
      supporting ball element support means for rotatably supporting the supporting ball elements in such a manner that outer surfaces of respective ones of the supporting ball elements are partially exposed inwardly of the spherical inner wall of the semi-spherical accommodating member, the supporting ball element support means being integrally formed to the frame; and
   detecting means for detecting coordinate data from an amount of rotation and direction of rotation of the coordinate data inputting ball, the detecting means being mounted on the frame,
   wherein the supporting ball element support means includes a plurality of inserting grooves, each of the inserting grooves includes a lower end member formed into a lower surface receiving member for receiving a supporting ball element.

8. A track ball coordinate data inputting device as claimed in claim 7, wherein each of said inserting grooves further includes a lower wall member formed into side surface receiving members which are elastically flexible.

9. A track ball coordinate data inputting device as claimed in claim 8, wherein each of said inserting grooves further includes catching protrusions formed above the side surface receiving members, respectively, each of the catching protrusions being protruded inwardly of said each of the inserting grooves, respectively.

10. A track ball coordinate data inputting device as claimed in claim 9, wherein the supporting ball element is rotatably supported by the lower surface receiving member, the side surface receiving member and the catching protrusions.

11. A track member coordinate data inputting device, comprising:
    a coordinate data inputting member;
    a frame including:
        an accommodating member for accommodating the coordinate data inputting member;
        a plurality of supporting structures for rotatably supporting the coordinate data inputting member;
        supporting structure support means for rotatably supporting the support structures such that outer surfaces of the supporting structures are partially exposed inwardly of an inner wall of the accommodating member; and
        detecting means, coupled to said frame, for detecting coordinate data from an amount of movement and direction of movement of the coordinate data inputting member,
    said supporting structure support means including a plurality of grooves, each of which is formed in a wall surface of the accommodating member such that grooves of said plurality of grooves extend from an edge of the wall surface and have a predetermined diameter to allow passage of respective supporting structures.

12. A track member coordinate data inputting device according to claim 11, wherein the supporting structure support means is integrally formed with said frame.

13. A track member coordinate data inputting device as claimed in claim 11, wherein each of said grooves further includes a lower wall member formed into side surface receiving members which are elastically flexible.

14. A track member coordinate data inputting device as claimed in claim 13, wherein each of said grooves further includes catching protrusions formed adjacent the side surface receiving members, respectively, each of the catching protrusions being protruded inwardly of the groove.

15. A track member coordinate data inputting device as claimed in claim 14, wherein the supporting structure is rotatably supported by the lower surface receiving member, the side surface receiving member and the catching protrusions.

* * * * *